(No Model.)
P. A. SAUM.
GAGE ATTACHMENT FOR RULES.
No. 496,748. Patented May 2, 1893.
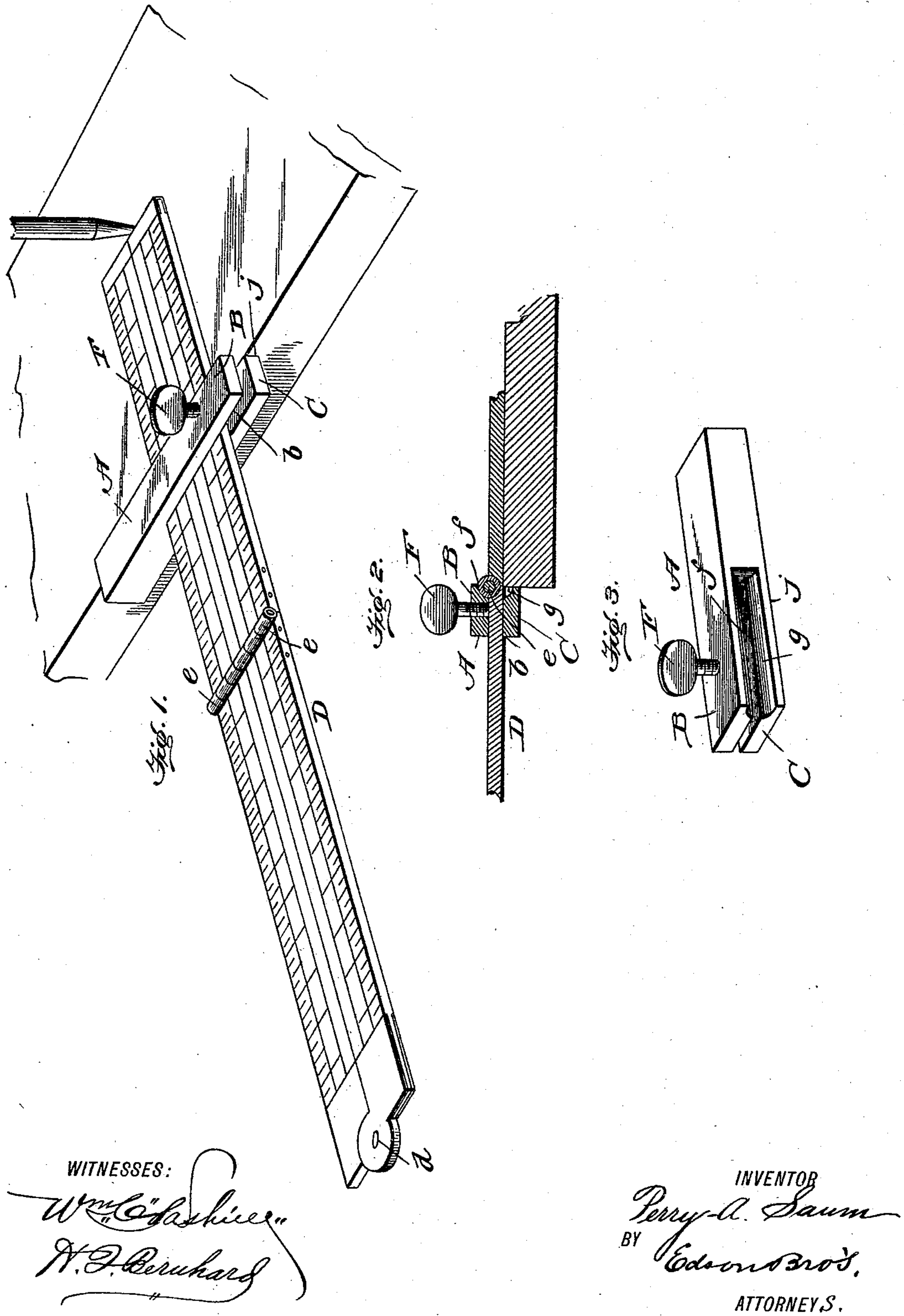
WITNESSES:
Wm. C. Gaskill
H. F. Bernhard
INVENTOR
Perry A. Saum
BY
Edson Bro's.
ATTORNEYS.
THE NORRIS PETERS CO., PHOTO-LITHO., WASHINGTON, D. C.

UNITED STATES PATENT OFFICE.

PERRY A. SAUM, OF WASHINGTON, DISTRICT OF COLUMBIA, ASSIGNOR OF ONE-HALF TO HENRY S. HAIGHT, OF SAME PLACE.

GAGE ATTACHMENT FOR RULES.

SPECIFICATION forming part of Letters Patent No. 496,748, dated May 2, 1893.

Application filed December 30, 1892. Serial No. 456,786. (No model.)

*To all whom it may concern:*

Be it known that I, PERRY A. SAUM, a citizen of the United States, residing at Washington, in the District of Columbia, have invented certain new and useful Improvements in Gage Attachments for Rules; and I do hereby declare the following to be a full, clear, and exact description of the invention, such as will enable others skilled in the art to which it appertains to make and use the same.

My present invention is a gage attachment for rulers designed more particularly for use by carpenters in marking and sawing strips off boards, and the object of the invention is to provide a simple and cheap gage which can be easily and conveniently carried in the pocket and readily applied to and adjusted on an ordinary foldable "two-foot" rule to enable the workman to mark off on a board any desired width, without liability of running splinters into the hand while moving the rule and gage along the edge of the board.

With this end in view, the invention consists of a gage having one end thereof forked or bifurcated to provide a longitudinal slot and two arms adapted to receive an ordinary rule transversely or at a right angle to the axis of the gage, in contradistinction to a gage in which the rule is fitted longitudinally of the body of the gage, between parallel confining flanges and in which the gage has a head, at one end, that fits against and rides on the edge of the board when the gage and rule are moved along the edge.

In my improved gage one of the longitudinal or side edges of the gage rides or bears against the edge of the board, and one of the arms of the gage is provided with a threaded socket in which is fitted the threaded shank of a clamping or binding screw that is adapted to bear up against the rule and which thus serves to firmly clamp the gage and rule together to prevent the gage from slipping while in the act of marking off on the board.

In a device of this character adapted to fit on a rule so that the axes of the rule and the gage are at right angles to each other, it is important that the gage shall fit snugly or closely up to the hinge-joints between the parts of the rule when it is desired to mark off six inches on the board; and to accomplish this end, I provide the gage with longitudinal grooves or recesses in the opposing edges of the arms. These grooves may be provided on one or both sides of the gage, to enable the same to be fitted on the rule from either the right or left hand side thereof; and it is evident that the gage can be slipped on the rule close up to the hinge joint so that a part of the hinge joint will fit in the grooves of the arms.

I have illustrated my invention in the accompanying drawings, forming a part of this specification, in which—

Figure 1 is a perspective view showing the gage fitted on the rule and the parts adapted for use in marking lines on the board. Fig. 2 is a detail sectional view through the gage and a part of the rule, showing the gage fitted on the rule so that a part of the hinge joint fits in one of the grooves in the arm of the gage. Fig. 3 is an enlarged detail perspective view of the gage, showing the same detached from a rule.

Like letters of reference denote corresponding parts in all the figures of the drawings.

A designates the gage which, preferably, consists of an oblong body forked or bifurcated at one end to provide a longitudinal slot *b* and the two parallel arms B, C. This slot extends a suitable distance longitudinally into the body of the gage, and its width and length are such that the rule D is adapted to fit snugly in between the arms of the gage when the rule is partially unfolded as shown by Fig. 1. This rule D is the ordinary "two foot" rule generally used by carpenters and mechanics, and the two halves of the rule are hinged together at *d* and each half has its sections connected by the hinge joints *e*, which joints *e*, *e*, of the respective halves of the rule are adapted to align when the rule is partially unfolded to fit in the gage as indicated by Fig. 1.

The gage is adapted to be fitted on the rule transversely across the same so that the longitudinal axes of the rule and gage are at right angles to each other, and the gage can be moved or adjusted on the rule to bring one edge of the gage to any desired mark on the scale of the rule. This gage is provided with a binding or clamping screw F which has its threaded shank working in a tapped or internally threaded socket in one of the arms, B, of the gage, and by turning said screw in the proper direction it can be forced against the rule so as to tightly clamp the gage to the rule and prevent the parts from slipping.

The arms B, C, of the gage are provided with longitudinal grooves or recesses *f*, *g*, in their opposing edges, and these grooves are curved or so shaped in cross section that the hinge joints *e* of the rule are adapted to fit in said groove of one of the arms when the gage is adjusted on the rule at a distance of six inches from the end thereof, in the manner shown by the detail view Fig. 2 of the drawings, and as will be readily understood. These grooves *f*, *g*, may be provided in the opposing edges of the arms B, C, on one side of the gage only as indicated by Fig. 3, but to enable the gage to be slipped upon the rule from either side thereof, the gage is preferably provided with the longitudinal grooves in the opposing edges of its arms on both sides of the gage.

The manner of using the gage is as follows: The rule is first partially unfolded so that the hinge joints *e*, *e*, align, and the rule is then slipped into the slot of the gage, between the arms B, C. The rule or gage can now be slipped until the edge *j* of the gage is opposite to the proper mark on the scale of the rule, and the binding screw is now tightened. The rule is now placed upon the board, with the edge or side *j* of the gage against the edge of the board, and by placing a pencil against the end of the rule and moving the clamped rule and gage along the board, the line that is to serve as a guide in sawing can be easily and quickly marked on the board without danger of the workman running splinters in his hands.

It is evident that the gage can be moved and held on the rule at any desired distance from the end of the same, and when it is desired to mark on the board a line six inches from the edge thereof, and parallel with the same, the gage is moved up to the joints *e*, *e*, of the hinge so that the joints fit in one of the grooves *f* or *g* of the arms B or C, and the screw again tightened.

This gage may be made of a single piece of any suitable metal, having the threaded socket for the clamping screw tapped therein; or it may be made of a suitable hard wood, as for instance, box wood, which may have the threaded socket formed therein or a metallic bushing may be secured in the gage to receive the shank of the binding screw, or the gage may be made of any material suitable for the purpose.

My improved gage is very simple and cheap of construction, and one of its chief merits is that it can be conveniently carried in the workman's pocket. It can be easily applied and adjusted, and will be found very efficient in service.

Having thus fully described my invention, what I claim as new, and desire to secure by Letters Patent, is—

1. A gage, substantially such as shown and described, having one end thereof forked or bifurcated longitudinally and forming the arms B, C, separated by an intervening slot adapted to receive the rule transversely to the longitudinal axis of the gage, a binding screw fitted in one of the arms, and the longitudinal groove in the edge of one of the arms, substantially as described, for the purpose set forth.

2. A gage, substantially such as shown and described, provided with the longitudinal arms B, C, separated by an intervening slot, a binding screw working in one arm of the gage, and the longitudinal grooves in the opposing edges of the arms, substantially as described.

In testimony whereof I affix my signature in presence of two witnesses.

PERRY A. SAUM.

Witnesses:
JOS. FORREST,
H. F. BERNHARD.